Figure 1:
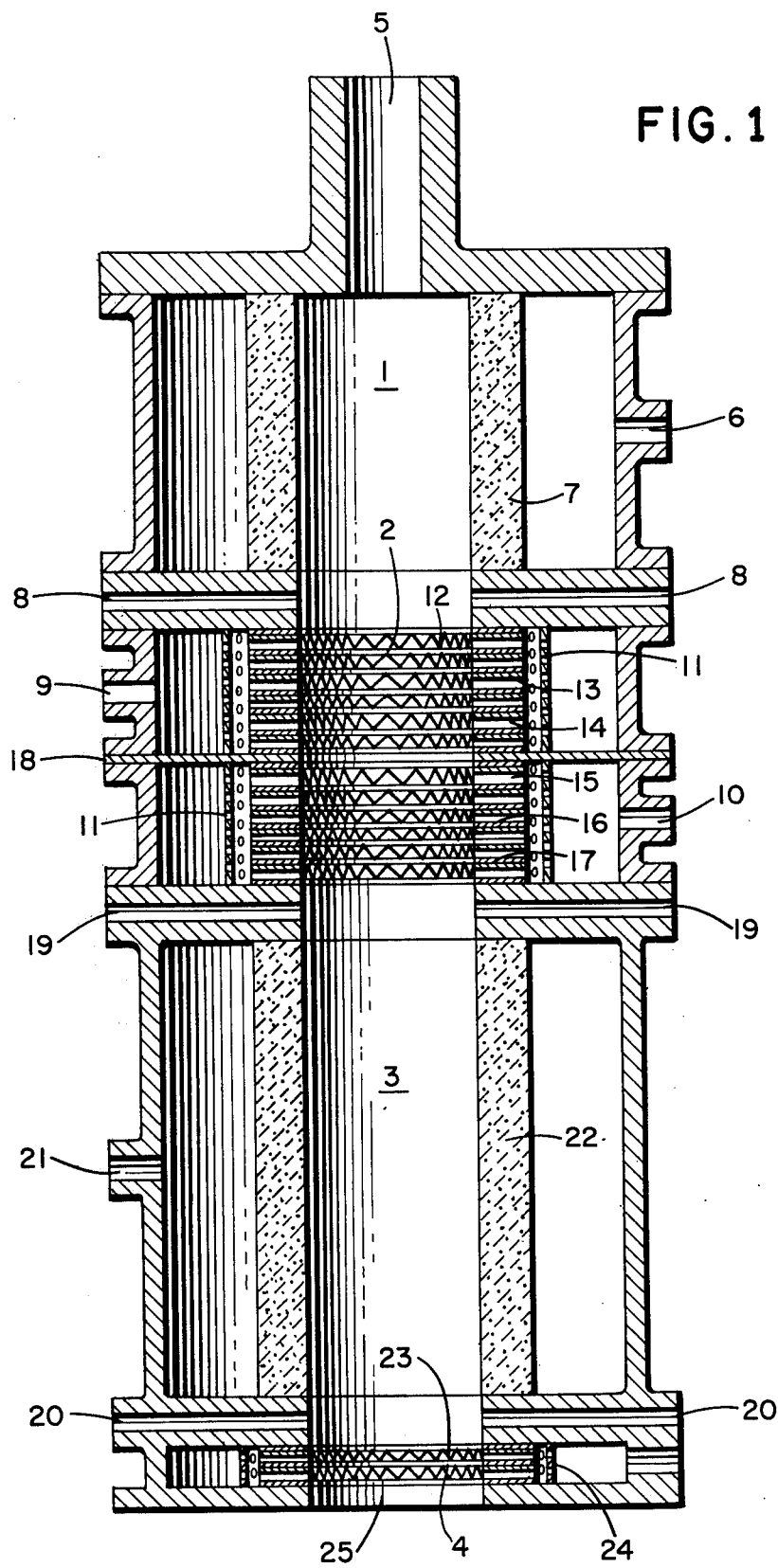

United States Patent [19]

Powell et al.

[11] 4,012,201
[45] Mar. 15, 1977

[54] REACTOR

[75] Inventors: Stanley Powell, Stockton-on-Tees; Glyn Thomas, Middlesbrough, both of England

[73] Assignee: Tioxide Group Limited, Billingham, England

[22] Filed: Oct. 23, 1974

[21] Appl. No.: 517,394

Related U.S. Application Data

[62] Division of Ser. No. 441,941, Feb. 13, 1974.

[30] Foreign Application Priority Data

Mar. 22, 1973 United Kingdom ............ 13752/73

[52] U.S. Cl. .................... 23/277 R; 23/284; 431/326; 431/328; 239/429; 239/590.3; 239/434; 261/94; 423/613; 423/625; 423/659

[51] Int. Cl.² .................... C01G 23/04; B05B 1/14; F23D 11/12

[58] Field of Search .......... 423/613, 625, 659; 23/277 R, 284; 431/326, 328; 239/429, 430, 431, 434, 590, 590.3, 590.5; 261/94, 118

[56] References Cited

UNITED STATES PATENTS

| 2,887,456 | 5/1959 | Halford et al. ............... 252/477 |
| 3,088,271 | 5/1963 | Smith ........................... 60/282 X |
| 3,203,763 | 8/1965 | Kruse ........................ 23/277 R X |
| 3,438,720 | 4/1969 | Cleaver ..................... 23/277 R X |
| 3,457,038 | 7/1969 | Kulling et al. ............. 23/277 R X |
| 3,464,792 | 9/1969 | Herriman et al. ............. 423/613 |
| 3,501,262 | 3/1970 | Arkless et al. ............... 423/613 |
| 3,531,247 | 9/1970 | Comyns et al. ............... 423/613 |

Primary Examiner—James H. Tayman, Jr.
Attorney, Agent, or Firm—Schuyler, Birch, Swindler, McKie & Beckett

[57] ABSTRACT

Apparatus suitable for oxidizing a metal halide in the vapor phase wherein at least part of the wall of the reaction zone is formed from crimped annular plates separated by uncrimped annular plates to form orifices through which at least one of the reactants can be introduced into the reaction zone.

16 Claims, 3 Drawing Figures

REACTOR

This is a division of application Ser. No. 441,941, filed Feb. 13, 1974.

The present invention relates to apparatus and process suitable for the oxidation of metal halides in the vapour phase to the corresponding metal/oxide. The apparatus and process are particularly suitable for the oxidation of a titanium tetrahalide such as titanium tetrachloride to pigmentary titanium dioxide.

It has proved difficult, for example in the production of pigmentary titanium dioxide from the oxidation of titanium tetrachloride in the vapour phase, to ensure that the reactants, e.g. the oxidising gas the metal halide vapour are introduced into the reaction zone in such a manner that they react quickly and maintain a flow-pattern in the reaction zone which ensures that the particle size and other physical characteristics are such as to produce high quality pigmentary material. Such conditions should, for example, ensure that the particles are not exposed to conditions which cause sintering for example by the presence of localised high temperature, thereby producing hard and possibly oversized particles, nor to excessive recirculation within the reaction zone whereby particles are also formed which have a poor size distribution and tend to be harder and/or larger than desirable. It is also very desirable that the reactor wall be maintained at a temperature below that at which sintering occurs on the wall.

Previously proposed reactors, for example for the oxidation of metal halides in the vapour phase, have either contained a fluidisable bed of inert particles (into the base of which was introduced the reactants) or have been tubular reactors into which both reactants may be axially introduced or in which one reactant may be axially introduced and one radially introduced. Such reactors are described, for example, in U.S. Pat. Nos. 2,791,490, 3,188,173 and 3,464,792.

The reactor described in U.S. Pat. No. 3,464,792 has been found to avoid many of the problems previously mentioned but it has proved time consuming to produce such reactors having a sufficient number of apertures around its periphery to provide maximum cooling, the greatest uniformity of distribution of the radially introduced reactant and a high degree of flexibility in design e.g. which can readily be varied to produce different conditions of reactant flow in the reactor.

It is an object of the present invention to provide a process and apparatus whereby the introduction of reactants into, and the flow pattern within, a reactor may be varied and/or improved.

Accordingly, one embodiment of the invention is an apparatus suitable for reacting a metal halide and an oxidising gas comprising a reaction zone, at least part of the wall of which is formed from crimped annular plates separated by uncrimped annular plates, means for introducing a reactant or reactants into the reaction zone through orifices formed between the annular plates and an exit port for withdrawing the reaction products from the reaction zone.

Another embodiment of the invention is a process for the oxidation of a metal halide in the vapour phase comprising forming at least part of the wall of a reaction zone from crimped annular plates separated by uncrimped annular plates, introducing reactants into the reaction zone, at least one of which is introduced through the orifices formed between the annular plates, maintaining the temperature in the reaction zone sufficiently high for the reactants to react and thereafter withdrawing the reaction products from the reaction zone.

In the attached drawings

Figure 2:
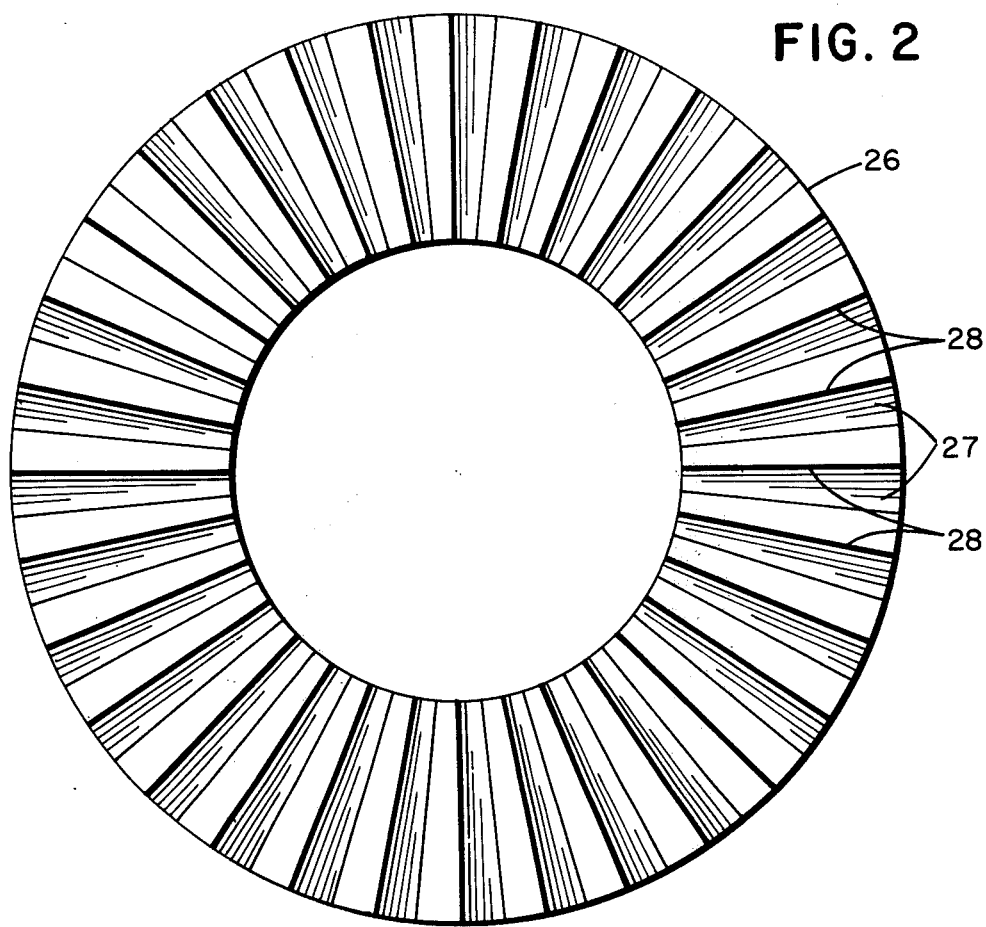
Figure 3:
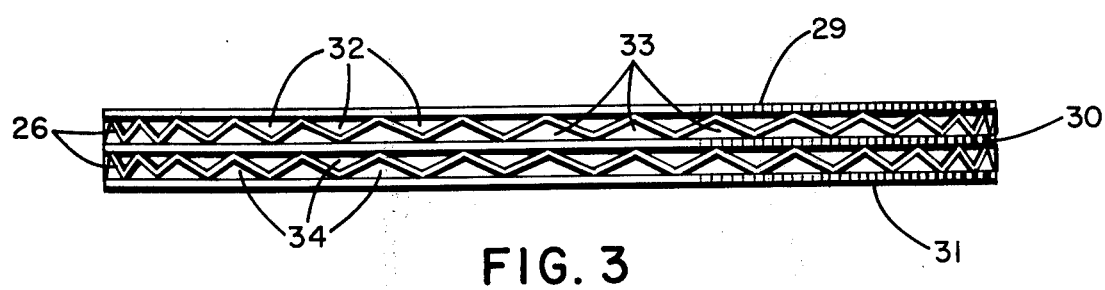

FIG. 1 shows a reaction zone according to the present invention together with a preconditioning zone, reaction completion zone and quench zone, FIG. 2 is a plan view of an annular crimped plate and FIG. 3 is a side view of two annular crimped plates separated by uncrimped plates.

In FIG. 1 there is a preconditioning zone 1 followed by a reaction zone 2, reaction completion zone 3 and quench zone 4. An inert gas or a reactant which has been heated by passage through an electric arc is introduced through inlet 5 into the preconditioning zone and a suitable gas is introduced through inlet 6 and is transpired through porous ceramic wall 7 thereby cooling the wall and combining with the arc-heated gas to form a suitable gas mixture having the desired temperature and flow pattern. Aluminium chloride is introduced via ports 8 which lead to a number of apertures (not shown) between the preconditioning zone and the reaction zone. A reactant or premixed reactants are introduced through ports 9 and 10, through perforated plate 11 (to assist distribution) and finally through sections 12 to 17, each of which consists of a number of crimped discs separated by uncrimped discs. Sections 12 to 14 are separated from sections 15 to 17 by means of sealing plate 18 to allow variations in the reactant supply.

Inlets 19 and 20 are provided to introduce gases if desired, for example inert gases or, possibly, a reactant such as oxygen, to modify the flow pattern of the reactants in the device and/or to ensure complete reaction of the metal halide.

A gas, for example an inert gas, cooled product gas and/or oxygen may be introduced through port 21 and transpires through porous wall 22 of the reaction-completion zone, again to cool the wall of the zone and/or to prevent accretion on the wall.

The quench zone is provided with a wall 23 of crimped and uncrimped discs and with a perforated plate 24 for the supply of quenching gas, for example cooled process product gas from which the metal oxide has been removed, to the quenching zone in sufficient quantity to cool the reaction gas stream and suspended metal oxide to the desired temperature.

The reaction products at the desired temperature are recovered from outlet 25 and are treated by conventional means, for example to give high quality metal oxide pigment.

FIG. 2 shows a plan view of a crimped plate 26 with depressions 27 between ridges 28 and FIG. 3 shows two crimped plates between uncrimped plates 29, 30 and 31, thus forming orfices or apertures 32, 33 and 34 through which a reactant or reactants are introduced into the reaction zone according to the present invention.

It is preferred that substantially the whole of the wall of the reaction zone proper be formed from the annular metal plates which are normally circular in shape, the reaction zone being enclosed by the inner circumference of the plates. Obviously annular plates of a shape other than circular can be used, if desired, for example of square or rectangular shape but the resulting corners cause difficulties in construction and operation and are preferably avoided.

The annular plates are normally thin to facilitate crimping and plates having a thickness in the range 0.001 inch to 0.125 inch and preferably in the range 0.005 inch to 0.05 inch are particularly suitable.

The outer and inner diameter of the plates (when circular) will, of course, vary with the size of reactor but diameters in the range 1 inch to 36 inches and particularly in the range 2 inches to 16 inches for internal diameter of the plates are envisaged. The internal diameter is, of course, that of the reactor when the plates are assembled. Outer diameters in the range 2 inches to 42 inches and particularly in the range 3 inches to 20 inches are also envisaged. If desired, of course, plates may be used which give a non-uniform cross-section to the reaction zone along its length i.e. they may be so formed as to provide a tapering reaction zone.

The number and dimensions of the crimps may vary depending upon the size of the orifices required but it has been found convenient to provide crimps such that from 1 to 50 and preferably from 5 to 25 elongated radially-directed depressions are provided per inch of inner circumference (when circular plates are used) on one side of the plate. A similar number of such depressions are, of course, formed on the other side of the plate by the crimping. Such depressions are conveniently from 0.002 inch to 1 inch and particularly from 0.005 inch to 0.2 inch in depth.

Normally the crimps are of uniform depth along their length but this again may vary, if desired. Also the crimped and plain rings may be formed from plates of differing thickness while a number of uncrimped annular plates may be assembled between individual crimped plates for the same purpose.

The annular plates (crimped and uncrimped) may be made from any material which is resistant to the conditions to which they are exposed. If desired, the plates may be of different material, for example the material of the crimped plates may differ from that of the uncrimped plates. It has been found convenient, however, to form both crimped and uncrimped annular plates from metal for ease of construction, for example from nickel. Aluminum, steel or compatible alloys among others may also be used, particularly in the oxidation of metal chlorides such as titanium tetrachloride.

The reaction products are normally withdrawn from the lower end of the reaction zone and may, if desired, pass into a reaction-completion zone into which additional reactants are not normally introduced but in which the oxidation of the metal halide is allowed to go to completion. Although, as noted, reactants are not normally introduced into this zone, it may be desirable to introduce a gas through the wall of this zone to prevent accretion. Such a gas may be an inert gas or recycle gas, i.e. process product gas after removal of the suspended metal oxide and cooling. Alternatively, additional oxidising gas, e.g. the gas used as an initial reactant, may be introduced into this zone and this is particularly useful if unreacted metal halide is likely to exist in the reaction-completion zone. The wall of the reaction-completion zone may be of any suitable structure. For example, it may be of externally cooled metal, of a refractory material (which may be porous for the transpiration of a gas therethrough), of similar structure to the previous reactor wall, i.e. consisting of crimped plates separated by uncrimped plates or it may be a solid wall having many orifices through which a suitable gas can be introduced. Generally, it is desirable that the wall should be cooled and that accretion on the wall should be prevented or reduced.

After the reaction-completion zone the reaction products may be passed to a quenching zone wherein relatively large quantities of gas are introduced to cool the reaction products rapidly to below reaction temperature, for example to below 800° C and preferably to below 600° C. The quenching gas is preferably cooled and recycled process product gas (e.g. gas from which the suspended metal oxide has been removed). The gas is preferably introduced through a large number of orifices in the wall of the quenching zone.

After the quenching zone the solid product may be treated by conventional means, for example filtration, classification (with or without slurrying in a liquid), milling, and/or coating with oxides or phosphates of other metals such as silicon, aluminium, zirconium, titanium and/or cerium. Alternatively, coatings may be applied by introducing the appropriate metal halide vapour into the reaction-completion section or the quench section, where a coating oxide may be formed by oxidation, halogen exchange, or by hydrolysis with added water e.g. as steam and/or finally by drying, if desired, and milling, for example by fluid energy mill.

The uniform introduction of reactants through the orifices between the crimped and uncrimped plates into the reaction zone may be facilitated by the provision of a perforated annular plate, tube or jacket containing restricting orifices in its wall. The passage of the reactants through the restricting orifices provides a pressure drop and thereby promoting uniform flow of gas or gases into the reaction zone. The restricting orifices are preferably formed tangentially to the outer annular wall of the reactor but may be formed radially or at any other desired angle. Orifices having a diameter in the range 0.002 in. to 0.125 in. and perferably one in the range 0.01 in. to 0.063 in. have been found convenient, depending on the scale of operation.

Sealing plates between series of crimped and uncrimped plates may be used to divide up the reactor length and such sealing plates may extend to the wall of the tube or outer jacket of the reactor to allow use of premixed or of separate reactants to adjacent series of crimped and uncrimped plates. Gas flow rates to separate series may be varied to control mixing within the reaction zone, and the sealing plate thickness and crimp depth varied in adjacent sections to obtain optimum performance.

It is normally necessary to maintain an elevated temperature in the reaction zone to ensure the oxidation of the metal halide, for example titanium tetrachloride, and this may be accomplished in any known manner. For example, an inert gas, a reactant or part of a reactant may be preheated to a high temperature and may then be introduced into the reaction zone, for example at the end opposite to that from which the reactants are withdrawn. Such preheating may be indirectly or by burning a fuel gas therein or by direct electrical preheating, for example by passing the gas through an electric arc formed between electrodes or formed by induction heating. In addition to such preheating the other reactants(s) are also normally preheated to some extent. For example, titanium tetra chloride, when used, is normally preheated to a temperature in the range 150° C to below 500° C. However, reactants introduced through the crimped metal assembly are in efficient heat transfer contact and recover heat radiated from the reaction zone to the assembly. By selecting a suitable, usually low, preheat for these reactants, the crimped metal assembly is cooled to avoid corrosion, and radiated heat is recycled to the reaction zone to minimise heat loss. Generally, the temperature of the crimped assembly should be maintained below 500° C when made in nickel, and below 350° C when aluminium or steel alloys are used.

The temperature to be maintained in the reaction zone will depend upon the reaction to be carried out therein but in the oxidation of metal halides generally temperatures in the range of about 900° C to 1,800° C are desirable and the preferred temperature for the oxidation of titanium tetrachloride is in the range 1,000° C to 1,600° C.

In some cases and particularly where the preheating of the inert gas, reactant or part of the reactant is by direct heating in an electric arc it may be advantageous to provide a preconditioning zone for the preheated gas before entering the reaction zone proper. This may consist of an elongated empty zone between the preheating device and the reaction zone in which the velocity of the preheated gas is modified before entering the reaction zone. It may be advisable to cool the walls of this zone, for example by forming them of porous material and transpiring a cooling gas therethrough to prevent erosion.

Where it is desirable to co-oxidise metal halides, for example to co-oxidise an aluminium and/or silicon chloride with titanium tetrachloride to provide improved pigmentary material, it may be advisable to introduce one or more of the metal halides through apertures other than those formed between the crimped and uncrimped plates. For example, when aluminium chloride is used, it has been found that impurities therein may block the orifices in the crimped-/uncrimped plates and in such circumstances the aluminium chloride may be introduced separately via a jacket and, if desired, through restricting orifices and then through orifices or a slot provided for the purpose opening into the reaction zone. Silicon tetrachloride, may, if desired, be introduced with the titanium tetrachloride and/or with the oxidising gas (or that part which is not preheated to a high temperature) through the orifices between the crimped/uncrimped plates. Other additions which may be introduced are alkali metal ions, usually in low concentrations.

Finally, it may be of advantage, in order to exercise more control over the flow patterns in the reactor to provide one or more slots or series of holes in the reactor wall between the crimped/uncrimped sections through which either a single reactant, for example oxygen or an inert gas or a mixture of reactants, can be introduced independently and/or at a different flow rate from that through the crimped/uncrimped plates.

Where a porous wall or walls is used for the purposes hereinbefore indicated it may conveniently have a porosity indicated by a density in the range 1.5 to 5.0 g/cc and preferably one in range 2.5 to 3.5 g/cc.

Where the vapour of additions such as aluminium chloride, (which may contain impurities it has been found convenient to introduce these through orifices having a diameter in the range of about 0.016 in. to 0.25 in. and preferably one in the range 0.0313 in. to 0.063 in. The orifices (when provided) opening into the reaction zone are usually larger than the restricting orifices, for example they may have a diameter in the range 0.016 in. to 0.30 in. and preferably with one in the range 0.030 in. to 0.15 in.

EXAMPLE 1

The reactor employed was similar to that shown in FIG. 1 of the attached drawings. The arc-heated gas introduced into the preconditioning zone was argon (1 g/mole/minute) heated to a temperature in excess of 10,000° K and oxygen (1.5 g/mole/minute) was transpired through the porous wall of the preconditioning zone which was 2 inches internal diameter and 8 inches long.

Aluminium chloride (0.07 g/mole/minute) was introduced through an outer perforated jacket containing restricting orifices to improve distribution and then through the orifices in the wall between the preconditioning and reaction zones. The aluminium chloride was mixed with titanium tetrachloride (1 g/mole/minute) and oxygen (0.5 g/mole/minute) before introduction and the mixture was preheated to 175° C.

The reaction zone, which was 8 inches in length and 2 inches internal diameter and 3 inches external diameter, consisted of a 1 inch long section followed by a sealing plate and a 7 inches long section. The two sections had separate reactant feeds as shown in FIG. 1. The nickel crimped and uncrimped plates of the reactor wall were 0.017 inches and 0.006 inches thick respectively and provided 200 radially directed passageways, each passageway having a height of 0.011 inches and a width of 0.09 inches at its widest point.

Gases supplied to the reactor wall first passed through a perforated jacket as shown in FIG. 1.

The first (1 inch long) section of the reactor wall was supplied with 1,384 g/moles/minute oxygen and 0.384 g/moles/minute $TiCl_4$ premixed and preheated to a temperature of 170° C. The second section was supplied with an equimolar mixture of titanium tetrachloride and oxygen (containing 2.688 g/moles/minute of oxygen) also at a temperature of 170° C. The reactor wall, during reaction, remained at a temperature below 500° C throughout and free from accretion.

The reaction-completion zone was a porous ceramic tube 3 inches external diameter, 2 inches internal diameter, and 14 inches long, through which was transpired 1.5 mole/min. oxygen. This was followed by the quench zone of similar internal diameter and 2 inches in length consisting of crimped and uncrimped plates. Nitrogen at 20° C was introduced through the wall of crimped and uncrimped discs, which were similar to those forming the wall of the reaction zone, to cool the reaction products to below 600° C before leaving the device.

The titanium dioxide produced was of very high rutile content and had outstanding pigmentary properties.

On examination very little accretion was found in any zone of the device after 25 minutes operation.

EXAMPLE 2

The reactor was similar to that described in Example 1 and the process was similar except that no $TiCl_4$ was introduced with the $AlCl_3$; another short section of crimped/uncrimped wall was provided downstream of the perforated wall though which the $AlCl_3$ was introduced and through this was introduced 1 g/mole/minute of $TiCl_4$; the reaction-completion zone was shortened to 10 inches and the quench zone was a 2 inch internal diameter pipe provided with angled perforations for the cooling gas.

Again, the product had outstanding pigmentary properties and the interior of the device was free from accretion after 30 minutes operation.

What is claimed is:

1. In a reactor suitable for reacting a metal halide vapor and an oxidizing gas at an elevated temperature to produce the corresponding metal oxide, said reactor comprising an inlet port at one end of said reactor for introducing hot gas thereinto, an outlet port at the opposite end of said reactor for removing reaction products therefrom and a reaction section in said reactor between said inlet port and said outlet port, the improvement comprising the side walls of said reaction section comprising a plurality of crimped annular plates separated by uncrimped annular plates, said crimped and uncrimped annular plates being disposed generally perpendicular to the longitudinal axis of said reaction section, the crimps of said crimped annular plates being generally radially directed with respect to the longitudinal axis of said reaction section, whereby generally radially extending orifices through said reaction section side walls are formed between adjacent crimped annular plates and uncrimped annular plates; said reactor further comprising means for introducing at least one reactant radially inwardly through said orifices into the interior of said reaction section and means surrounding said reaction section walls for facilitating uniform introduction of reactants through said orifices; the openings of said orifices through the radially inner and outer surfaces of said reaction section side walls being distributed in a substantially continuous manner around the circumference of the side walls whereby the introduction of reactant gas through said side walls into the reaction section is effected substantially uniformly around the circumference of the reaction section.

2. Apparatus as claimed in claim 1 wherein the annular plates have a thickness in the range 0.001 in. to 0.125 in.

3. Apparatus as claimed in claim 1 wherein the annular plates are provided with crimps consisting of from 1 to 50 elongated, radially-directed, depressions per inch of inner circumference.

4. Apparatus as claimed in claim 1 wherein the crimps are elongated radially directed depressions having a depth in the range 0.002 in. to 1 in.

5. Apparatus as claimed in claim 1 wherein the reaction section is followed by a reaction-completion section.

6. Apparatus as claimed in claim 5 further comprising means for introducing a gas through the wall of the reaction-completion section into the reaction-completion section.

7. Apparatus as claimed in claim 5 wherein the reaction-completion section is followed by a quenching section; said apparatus further comprising means for introducing a gas through the wall of the quenching section into the quenching section.

8. Apparatus as claimed in claim 7 further comprising means for introducing cooled recycled product gas through the wall of the quenching section into the quenching section.

9. Apparatus as claimed in claim 1 wherein there is provided a pre-conditioning section before the reaction section.

10. Apparatus as claimed in claim 9 further comprising means for introducing a gas through the wall of the pre-conditioning section into the pre-conditioning section.

11. Apparatus as recited in claim 9 further comprising means for introducing a gas into the reactor near the end of the pre-conditioning section at the beginning of the reaction section.

12. Apparatus as recited in claim 11 wherein the gas introduced at the beginning of the reaction section first passes through restricting orifices having a diameter in the range 0.016 inches to 0.25 inches and thereafter passes into the reaction section through orifices having a diameter in the range 0.016 inches to 0.30 inches.

13. A reactor as recited in claim 1 wherein said reactant introducing means comprises a jacket surrounding the exterior of the reaction section side walls, said jacket defining an enclosed space in communication with the outer ends of said generally radial orifices, said jacket further being provided with an inlet port for introducing a reactant into said enclosed space.

14. Apparatus as recited in claim 13 wherein said means for facilitating uniform introduction of reactants comprises a gas distributor plate disposed in said enclosed space, said plate being radially spaced from and surrounding the orifice-containing side walls of said reaction section, said distributor plate further being provided with restricting orifices for gas passing between the jacket inlet port and the orifices in the reaction section side walls, said restricting orifices being sufficiently small to produce a pressure drop in a gas flowing between the jacket inlet port and the orifices in the reaction section side walls, whereby a uniform flow of gas into the reaction section is promoted.

15. Apparatus as claimed in claim 14 wherein the restricting orifices have a diameter in the range 0.002 in. to 0.125 in.

16. Apparatus as recited in claim 13 further comprising at least one sealing plate extending radially between the side wall of the reaction section and the surrounding jacket, said sealing plate dividing the enclosed space defined by said jacket into separate transverse sections, each separate section being provided with an inlet port through said jacket for separately introducing a reactant into that section.

* * * * *